(12) United States Patent
Sim

(10) Patent No.: US 9,948,084 B2
(45) Date of Patent: Apr. 17, 2018

(54) DC CIRCUIT BREAKER AND CIRCUIT BREAKING METHOD OF THE DC CIRCUIT BREAKER

(71) Applicant: LSIS CO., LTD., Gyeonggi-do (KR)

(72) Inventor: Jung-Wook Sim, Sejong-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 176 days.

(21) Appl. No.: 14/983,355

(22) Filed: Dec. 29, 2015

(65) Prior Publication Data

US 2016/0190791 A1    Jun. 30, 2016

(30) Foreign Application Priority Data

Dec. 31, 2014    (KR) .................... 10-2014-0196022

(51) Int. Cl.
*H02H 3/06*        (2006.01)
*H02H 3/087*      (2006.01)
(Continued)

(52) U.S. Cl.
CPC .............. *H02H 3/06* (2013.01); *H01H 9/541* (2013.01); *H01H 9/548* (2013.01);
(Continued)

(58) Field of Classification Search
CPC .......... H02H 3/06; H02H 3/087; H01H 9/541; H01H 9/548; H01H 33/596; H01H 2009/543; H01H 2009/544
(Continued)

(56) References Cited

U.S. PATENT DOCUMENTS

2012/0299393 A1    11/2012  Hafner et al.
2013/0021705 A1*   1/2013  Sim .......................... H02H 9/08
                                                           361/93.9
(Continued)

FOREIGN PATENT DOCUMENTS

CN          101373895 A       2/2009
CN          102237668 A       11/2011
(Continued)

OTHER PUBLICATIONS

Extended European Search Report for Application No. 15198491.1 dated May 17, 2016, in 10 pages.
(Continued)

*Primary Examiner* — Thienvu Tran
*Assistant Examiner* — Kevin J Comber
(74) *Attorney, Agent, or Firm* — K&L Gates LLP

(57)  ABSTRACT

Disclosed embodiments relate to a DC circuit breaker and a circuit breaking method thereof which comprises: a measuring portion for measuring a DC current conducted through a first circuit portion; the first circuit portion for conducting and blocking the DC current; and a second circuit portion for conducting and blocking the DC current which is bypassed from the first circuit portion and controlling the open/close operation of the first circuit portion according to a measuring result of the measuring portion, wherein, in the first circuit portion and the second circuit portion, switching elements, which are included in each of them, are connected in a parallel configuration such that a high switching operation during a blocking operation can be improved and the DC current can be blocked in a safer and more efficient manner, and a circuit breaking method of the DC circuit breaker.

15 Claims, 10 Drawing Sheets

(51) Int. Cl.
*H01H 9/54* (2006.01)
*H01H 33/59* (2006.01)

(52) U.S. Cl.
CPC .......... *H01H 33/596* (2013.01); *H02H 3/087* (2013.01); *H01H 2009/543* (2013.01); *H01H 2009/544* (2013.01)

(58) Field of Classification Search
USPC ........................................................ 361/93.6
See application file for complete search history.

(56) References Cited

U.S. PATENT DOCUMENTS

| | | | |
|---|---|---|---|
| 2014/0226247 | A1 | 8/2014 | Gaxiola et al. |
| 2014/0313628 | A1* | 10/2014 | Hafner ................... H01H 9/541 361/91.5 |

FOREIGN PATENT DOCUMENTS

| | | |
|---|---|---|
| CN | 102687221 A | 9/2012 |
| CN | 102891468 A | 1/2013 |
| CN | 103618298 A | 3/2014 |
| CN | 103646805 A | 3/2014 |
| CN | 104137211 A | 11/2014 |
| CN | 104184108 A | 12/2014 |
| EP | 2549611 A2 | 1/2013 |
| JP | H05234411 A | 9/1993 |
| JP | 2002-527870 A | 8/2002 |
| JP | 2008-004373 A | 1/2008 |
| JP | 2008-48588 A | 2/2008 |
| KR | 10-2012-0112734 A | 10/2012 |
| KR | 10-2014-0095184 A | 8/2014 |
| WO | 2011057675 A1 | 5/2011 |
| WO | 2013-071980 A1 | 5/2013 |

OTHER PUBLICATIONS

Office Action dated Nov. 1, 2016 issued in corresponding Japanese Application No. 2015-256767.
Chinese Office Action for related Chinese Application No. 2017091501841950; action dated Sep. 20, 2017; (8 pages).

* cited by examiner

DC CIRCUIT BREAKER AND CIRCUIT BREAKING METHOD OF THE DC CIRCUIT BREAKER

CROSS-REFERENCE TO RELATED APPLICATION

This application claims the benefit of Korean Patent Application No. 10-2014-0196022, filed on Dec. 31, 2014, in the Korean Intellectual Property Office, the disclosure of which is incorporated herein in its entirety by reference.

BACKGROUND

1. Technical Field

Disclosed embodiments relate to a direct current (DC) circuit breaker and a circuit breaking method thereof and, more particularly, to a DC circuit breaker which can improve a high switching operation during a circuit breaking operation as well as block a DC current in a safer and more efficient manner, and a circuit breaking method of the DC circuit breaker.

2. Description of the Related Art

When a fault occurs in a power system, a fault current is blocked through a circuit breaker in order to protect power devices and equipment. When a failure occurs in a system, an electric relay determines a failure state and sends out a trip signal for opening to the circuit breaker. After receiving the trip signal, the circuit breaker opens a contact point of the circuit breaker where the fault current flows by using a driving device in order to block the current. In the meantime, an arc current comes to flow at both terminals of the circuit breaker and this fault current will keep flowing due to the arc current unless a sufficient insulation condition is established on the contact point. As for an alternating current (AC) system, the current passes through a current zero point at a constant period, and the arc current will extinguish when the current reaches zero to block the fault current as well as a sufficient contact point distance is guaranteed. However, as long as a direct current DC system is concerned, it is very hard to extinguish the arc current since there is no current zero point. Generally, it is possible to block the DC fault current by spreading the arc at a voltage not greater than 3000 V, while it is hard to extinguish the arc current when the voltage is higher than that. Therefore, a technology, which blocks the fault current by emulating a current zero point as in the AC system by using various ways, is required. By using DC circuit breaking technologies which have been developed up to now, there are circuit breakers which are developed by using one of: a reverse voltage type in which the arc generated at the contact point is spread; a resonance type in which a separate resonance circuit is formed to cause resonance by using the DC current; a reverse current type in which parallel capacitors are precharged by charges such that, when a failure occurs, the charges are applied in a direction opposite to that of the arc current to block the arc current through current superposition; and power semiconductors which can be turned on and off.

SUMMARY

Some examples of circuits are illustrated in FIGS. 1-3 and their configurations as well as operations will be explained by referring to the drawings.

FIG. 1 is a configuration diagram which shows a configuration of a conventional hybrid superconducting fault current limiter.

FIG. 2 is a configuration diagram which shows a configuration of a conventional hybrid fault current limiter.

FIG. 3 is a configuration diagram which shows a configuration of a conventional DC circuit breaker.

The conventional hybrid superconducting fault current limiter shown in FIG. 1 consists of a main circuit having a superconductor P1 and a high speed switch P4, a high speed switch driving coil P2 which is connected in parallel with the main circuit, a power semiconductor P13 which is connected in series to the driving coil P2 and serves to block the fault current, and a CLR P14 which limits the fault current bypassed by a high speed switch, and the power semiconductor and the CLR are connected in parallel with each other.

Detailed operations of the hybrid superconducting fault current limiter are as follows.

1) When a failure occurs in the system and a current exceeding a threshold current of the superconductor P1 of the main circuit, the superconductor P1 is quenched and a resistance is generated.
2) The fault current is divided into the main circuit and the fault current limiter circuit and flows through the driving coil P2.
3) In the meantime, a counter electromotive force is induced on electromagnetic repulsion plates of the high speed switch P4 by the electromagnetic field generated on the driving coil P2, such that a high speed switch contact point P5, which is connected to a link P5a, is opened.
4) The high speed switch contact point P5 is opened to block a main circuit current and the blocked current is introduced into the fault current limiter circuit.
5) Then, when the high speed switch open state of is acknowledged by a controller P6a, the power semiconductor P13, which is now at a conduction state, is turned off to bypass the fault current toward the CLR P14 such that fault current energy is reduced and the fault current is limited.

The conventional hybrid fault current limiter shown in FIG. 2 consists of an accident detecting portion P10, a main circuit which is connected in series to the accident detecting portion and includes a contact portion P25 of a high speed switch P20 and a power semiconductor P30 which can be turned off, a capacitor P40 which is connected in parallel with the main circuit and charged by the fault current, and a CLR P50 which limits the fault current after the capacitor P40 is charged.

Detailed operations of the hybrid fault current limiter are as follows.

1) When a failure occurs in a system, the accident detecting portion P10 detects the failure and delivers an open trip signal to a source portion for the high speed switch P20.
2) When the open trip signal is received, the power semiconductor P21 of the high speed switch source portion is turned on to conduct the current through a precharged internal capacitor P22, a driving driver P23 of the high speed switch P20 is magnetized to drive the electromagnetic repulsion plate P24 at a high speed, and the contact point P25 of the high speed switch is opened.
3) When the contact point P25 is opened, a controller P26 sends a turn-off trip signal to the power semiconductor P30 such that the current of the main circuit is blocked.
4) Then, the fault current is conducted to a capacitor P40, which is connected in parallel with the main circuit, and a voltage generated across the device is applied across the high speed switch contact point P25, which is opened at high speed, such that no voltage is applied on the power semiconductor P30.

5) When the capacitor P40 is charged, the fault current flows toward the CLR P50, and the fault current energy is reduced such that the current is limited.

The conventional DC circuit breaker shown in FIG. 3 is configured quite similarly to those configurations shown in FIG. 1 and FIG. 2, and consists of a main circuit having a high speed switch P300 and a power semiconductor P400, a capacitor P500 which is connected in parallel with the main circuit, and an arrester P600 which is connected in parallel with the circuits to extinguish energy.

Detailed operations of the DC circuit breaker are as follows.

1) When a failure occurs in a system, the power semiconductor P400 is turned off and the high speed switch P300 is opened at almost same time.
2) The current of the main circuit is blocked and conducted toward the parallel-coupled capacitor P500 such that the capacitor is charged.
3) The high speed switch P300 is opened at high speed and the capacitor P500 is charged, and then remaining energy inside the system is extinguished through the arrester P600.
4) When the remaining energy extinguishment is completed, the current is blocked.

As for the circuit shown in FIG. 1, a high cost cooling system is used since a superconductor is used in the main circuit, and the fault current is divided according to the difference between the impedance, which is generated when the superconductor of the main circuit is quenched, and a driving coil P2 impedance, which is connected in parallel with the impedance of the superconductor, of the fault current limiter circuit. When the impedance generated when the superconductor P1 is quenched is smaller, the current which is bypassed toward the fault current limiter side gets smaller, and the current flowing through the driving coil P2 is reduced, thereby causing a drawback of lowering a driving speed of the high speed switch.

As for the circuit shown in FIG. 2 and FIG. 3, a current is unintentionally conducted toward a capacitor circuit, when the high speed switch contact point is opened, and the capacitor can be falsely charged before a contact point distance reaches an insulation state.

As mentioned above, it is not easy to apply a high speed switch due to problems that a sufficient magnetic field is not generated in the driving driver owing to the current division using a conventional superconductor, that a cost rises since an extremely low temperature cooling system is required when adopting the superconductor, and that a cooling cost rises due to a big loss when the conducting current is increased.

Therefore, it is an objective of some embodiments to provide, with a purpose of overcoming the limitations imposed on the prior art, a DC circuit breaker to which a high speed switch can be easily applied and which can improve a high switching operation during a blocking operation and block a DC current in a safer and more efficient manner, as well as a circuit breaking method of the DC circuit breaker.

The DC circuit breaker, which is for solving the objective as explained in detail and disclosed in this specification, comprises: a first circuit portion which conducts or blocks a DC current, a measuring portion which measures the DC current which is conducted to the first circuit portion, and a second circuit portion which conducts or blocks the DC current, which is bypassed from the first circuit portion, and controls the opening/closing of the first circuit portion according to a measuring result of the measuring portion, and, in the first circuit portion and the second circuit portion, switching elements, which are included in each of the first and second circuit portions are arranged in a parallel structure.

In one embodiment, the measuring portion can include a current transformer which is arranged at an earlier stage than the first circuit portion measure the DC current, and a determining portion which determines whether a failure occurs based on a measuring result of the current transformer.

In one embodiment, the determining portion can generate open/close signals, on which the operations of the switching elements included in each of the first circuit portion and the second circuit portion are based, according to a measuring result, and can deliver the generated signals to the switching elements included in each of the first circuit portion and the second circuit portion.

In one embodiment, the switching elements which are included in each of the first circuit portion and the second circuit portion can be power semiconductor elements which are turned on/off according to the measuring result of the measuring portion.

In one embodiment, the power semiconductor element can be formed in a bidirectional structure in which two semiconductor elements conduct the current in different directions.

In one embodiment, the first circuit portion can include a first switching element which conducts and blocks the DC current, and a first contact portion which opens and closes the first circuit portion, and the first switching element and the first contact portion can be connected in series to each other.

In one embodiment, one end of the first switching element can be connected to an input terminal to which the DC current is applied, and the other end of the first contact portion can be connected to an output terminal from which the DC current is outputted.

In one embodiment, the first switching element blocks the DC current according to the measuring result of the measuring portion 10 such that the DC current is bypassed toward the second circuit portion.

In one embodiment, the first contact portion can be close-circuited during a normal use and can be open-circuited when the current flows through a driving coil which is included in the second circuit portion.

In one embodiment, the second circuit portion can include a second switching element which conducts and blocks the DC current which is bypassed from the first circuit portion, and the driving coil which allows the first contact portion, which is included in the first circuit portion, to be open-circuited when the driving coil conducts the current, and the second switching element and the driving coil can be connected in series to each other.

In one embodiment, the second circuit portion can be connected in parallel with the first switching element, which is included in the first circuit portion.

In one embodiment, one end of the second switching element can be connected to one end of the first switching element, while the other end of the driving coil can be connected to the other end of the first switching element.

In one embodiment, the second switching element can block the bypassed DC current after the first contact portion is open-circuited.

In one embodiment, the second circuit portion can further include an impedance element which prevents an overvoltage from being applied on the second switching element.

In one embodiment, one end of the impedance element can be connected to the other end of the second switching element, while the other end of the impedance element can be connected to one end of the driving coil.

In one embodiment, the impedance element can allow, during a normal state, the impedance of the second circuit portion to be maintained to be higher than the impedance of the first circuit portion.

In one embodiment, The DC circuit breaker can further comprise a charging portion which is charged by the DC current bypassed from the first circuit portion and the second circuit portion, and a limiting portion which limits the current which is discharged from the charging portion after the charging portion is charged, and the charging portion and the limiting portion can be connected in parallel with each other.

In one embodiment, the charging portion can be connected in parallel with the first circuit portion and include a capacitor which is charged by the DC current bypassed from the first circuit portion and the second circuit portion, and a second contact portion which opens and closes the charging portion, and the capacitor and the second contact portion can be connected in series to each other.

In one embodiment, one end of the capacitor can be connected to one end of the first switching element included in the first circuit portion, while the other end of the second contact portion can be connected to the other end of the first contact portion included in the first circuit portion.

In one embodiment, the capacitor can be charged by the bypassed DC current from when the second contact portion is close-circuited until the first contact portion is open-circuited and the arc, which is generated at the first contact portion, is extinguished.

In one embodiment, the second contact portion can be open-circuited during a normal use and can be short-circuited when the current flows through a driving coil which is included in the second circuit portion.

In one embodiment, the DC circuit breaker can further comprise arresters which are arranged at an input terminal, to which the DC current is inputted, and an output terminal, from which the DC current is outputted, respectively, and the arresters can extinguish the remaining electrical energy after a circuit breaking operation of the DC circuit breaker.

Also, a circuit breaking method according to an embodiment of the present invention for solving the objective as explained above in detail comprises a step in which a measuring portion measures a DC current which is conducted through the first circuit portion, a step in which the first circuit portion blocks the DC current according to the measuring result, a step in which the DC current, which is bypassed from the first circuit portion, is conducted to the second circuit portion, a step in which the second circuit portion controls the first circuit portion to be open-circuited and a charging portion to be close-circuited, a step in which the second circuit portion blocks the bypassed DC current, a step in which the charging portion is charged by the DC current which is bypassed from the second circuit portion, a step in which the charging portion discharges the charged current to the limiting portion, and a step in which the limiting portion limits the discharged current.

According to embodiments the present invention, a high speed switching operation at a circuit breaking operation can be improved, the high speed switch can be easily applied, and DC current can be stably and efficiently blocked.

According to embodiments of the present invention, it is possible to realize higher speed performance than a driving method using a superconductor for the same fault current by delivering the overall fault current to a driving circuit by turning off the power conductor in the main circuit, rather than in the case of the driving force of a high speed switch generated according to the fault current divided by a resistance difference generated when the superconductor of the main circuit is quenched, when using a conventional superconductor.

According to embodiments of the present invention, an insert contact point can be added into a parallel capacitor circuit which is linked with a circuit breaking contact point of the high speed switch, thereby preventing the capacitor from being charged undesirably during a normal state.

BRIEF DESCRIPTION OF THE DRAWINGS

The above and other features and advantages of the disclosure will become more apparent by describing in detail exemplary embodiments thereof with reference to the attached drawings in which.

DETAILED DESCRIPTION

Figure 1:
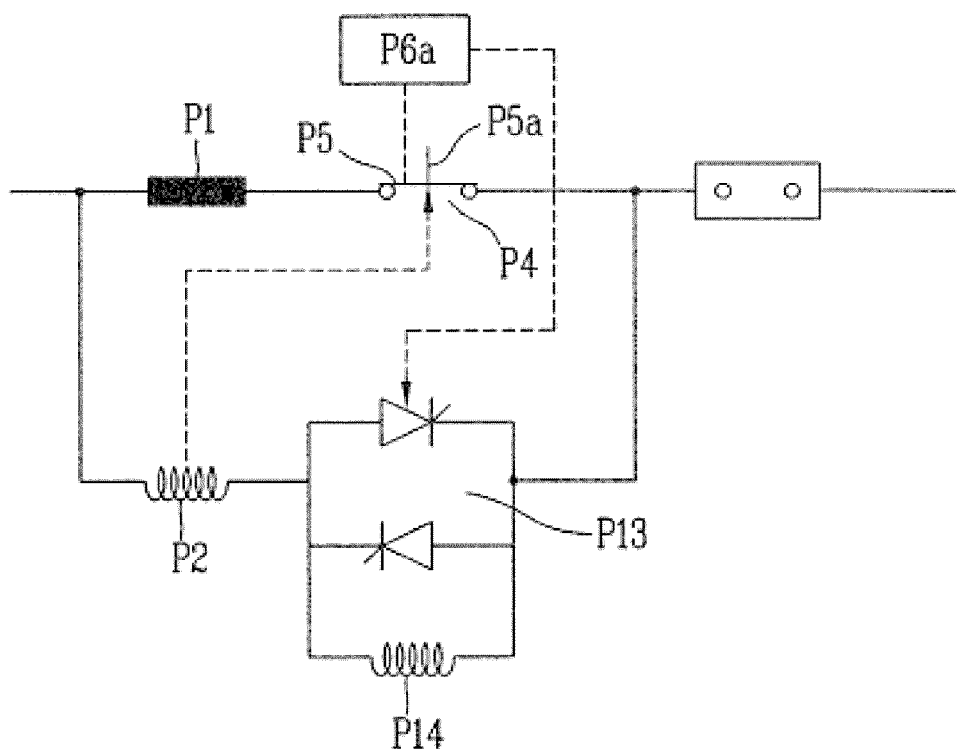
FIG. 1 is a configuration diagram which shows a configuration of a conventional hybrid superconducting fault current limiter.
Figure 2:
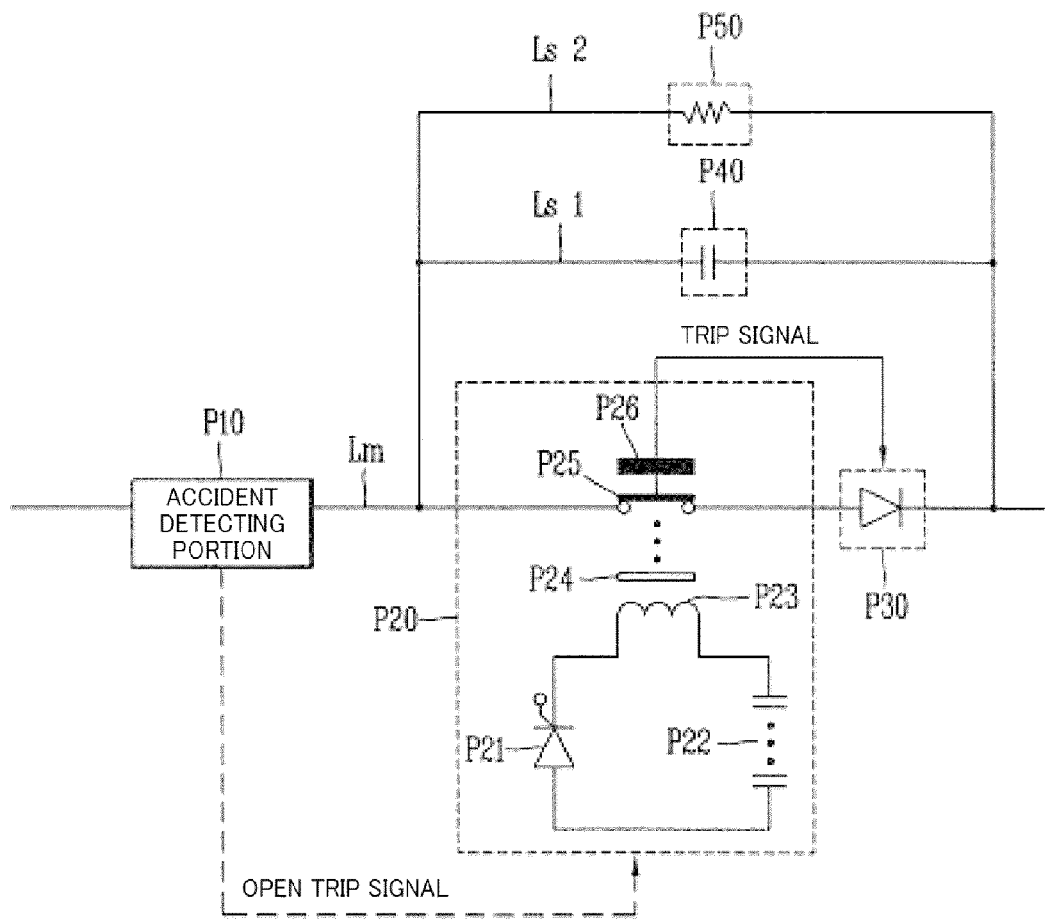
FIG. 2 is a configuration diagram which shows a configuration of a conventional hybrid fault current limiter.
Figure 3:
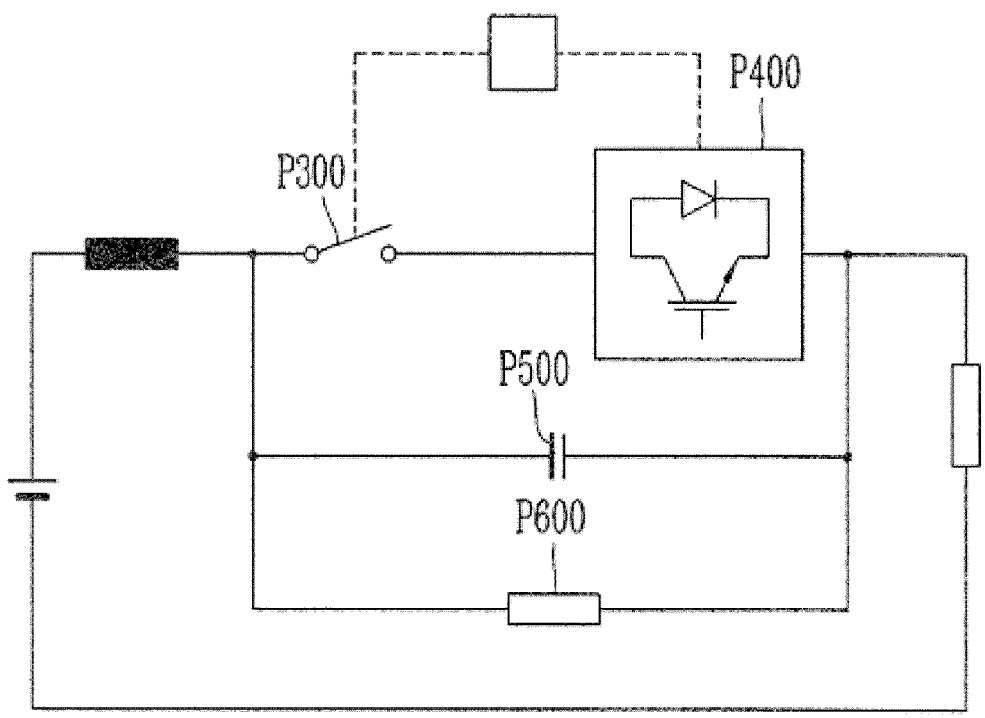
FIG. 3 is a configuration diagram which shows a configuration of a conventional DC circuit breaker.

Disclosed embodiments can be applied to a DC circuit breaker and a circuit breaking method thereof. However, the technology disclosed in this specification is not limited to these, and can be applied to all kinds of protective devices and current limiting circuits included in the protective devices such as conventional circuit breakers, switches, electric relays, surge absorbers, electronic contactors, and circuit breakers, etc. to which the technical principles of embodiments of the present invention can be applied.

Technical terms used herein are used merely for illustrating specific embodiments, and it is to be noted that they are not intended to limit the technical spirit disclosed in this specification. Also, the technical terms used herein are to be construed by the meanings normally accepted by the person having ordinary skill in the relevant art, unless specifically defined by other meanings in this specification, and it is neither to be construed by excessively comprehensive meanings nor excessively narrow meanings.

Also, when the technical terms used herein are determined to be wrong technical terms which fail to represent the technical spirit disclosed in this specification correctly, the terms are to be replaced by the technical terms which can be accurately understood by the person having ordinary skill in the art. Also, the general terms used in this specification are to be construed as defined in the dictionary or according to context, and they are not to be construed in an excessively narrow meaning.

Also, the singular representation used in this specification includes plural representations unless it is clearly expressed in the context to the contrary. The terms "include" or "is composed of" in this specification are not to be construed to necessarily include all components and all steps cited in this specification, and it should be construed to exclude some components or some steps or further include additional components and steps.

In the following, embodiments disclosed in this specification are to be describe in detail by referring to the appended figures, wherein the same reference numerals are given to the same or like components irrespective of the number of the figures, and duplicate description on them will be omitted.

Also, when it is determined that a detailed description on a relevant known art will obscure the subject matter disclosed in the specification while describing the technologies disclosed in this specification, the detailed description will be omitted. Also, it is to be noted that the appended figures are only for facilitating the technical spirit disclosed in this specification and the technical spirit is not to be construed to be limited by the appended figures.

At first, the DC circuit breaker which is disclosed in this specification is described by referring to FIGS. 4-9.

Figure 4:
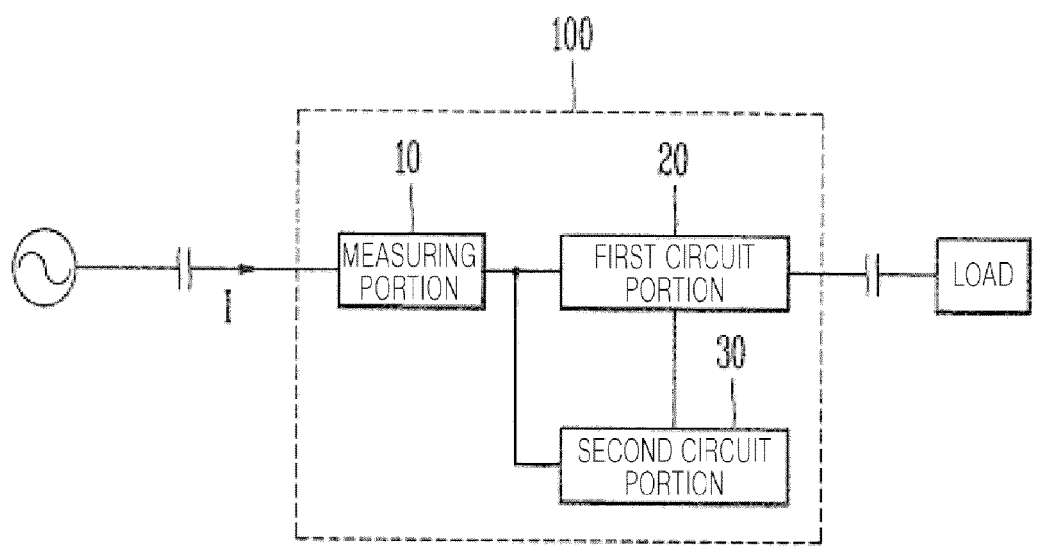
FIG. 4 is a configuration diagram which shows a configuration of a DC circuit breaker disclosed in this specification.

FIG. 4 is a configuration diagram which shows a configuration of a DC circuit breaker disclosed in this specification.

Figure 5:
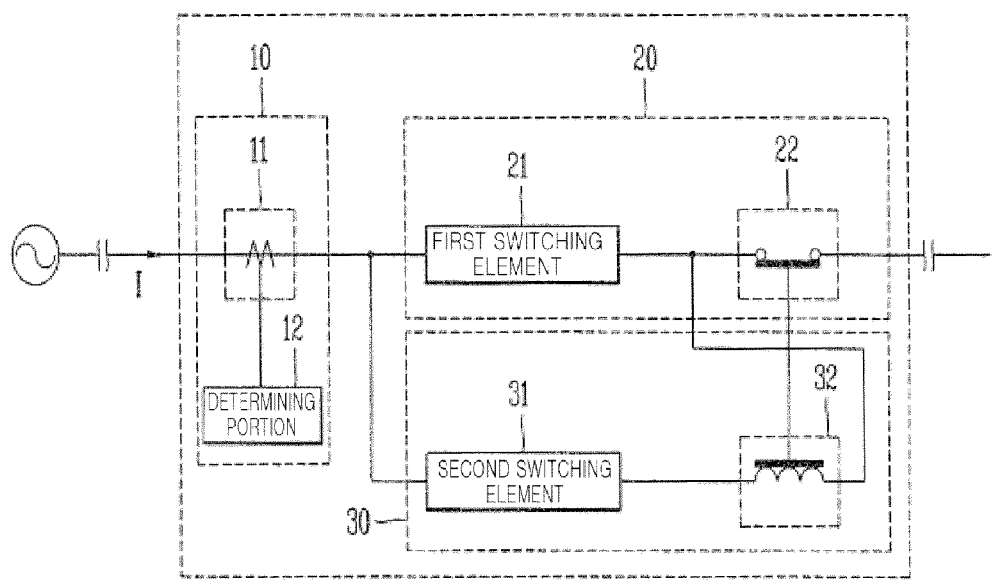
FIG. 5 is a configuration diagram which shows a configuration of an embodiment of the DC circuit breaker shown in FIG. 4.

FIG. 5 is a configuration diagram which shows a configuration of an embodiment of the DC circuit breaker shown in FIG. 4.

Figure 6A:
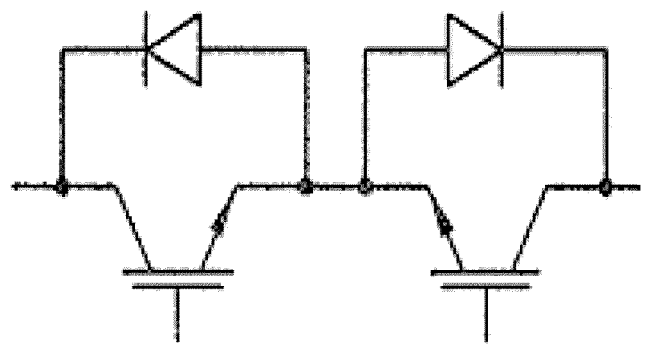
FIG. 6A is an illustration showing an example of a switching element according to an embodiment of the DC circuit breaker disclosed in this specification.

FIG. 6A is an illustration showing an example of a switching element according to an embodiment of the DC circuit breaker disclosed in this specification.

Figure 6B:
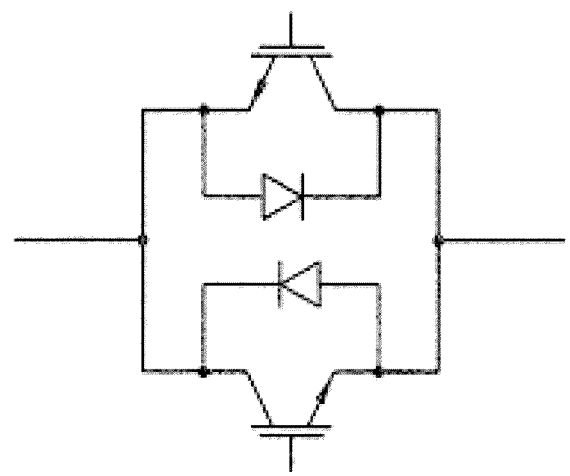
FIG. 6B is an illustration showing an example of a switching element according to an embodiment of the DC circuit breaker disclosed in this specification.

FIG. 6B is an illustration showing an example of a switching element according to an embodiment of the DC circuit breaker disclosed in this specification.

Figure 7:
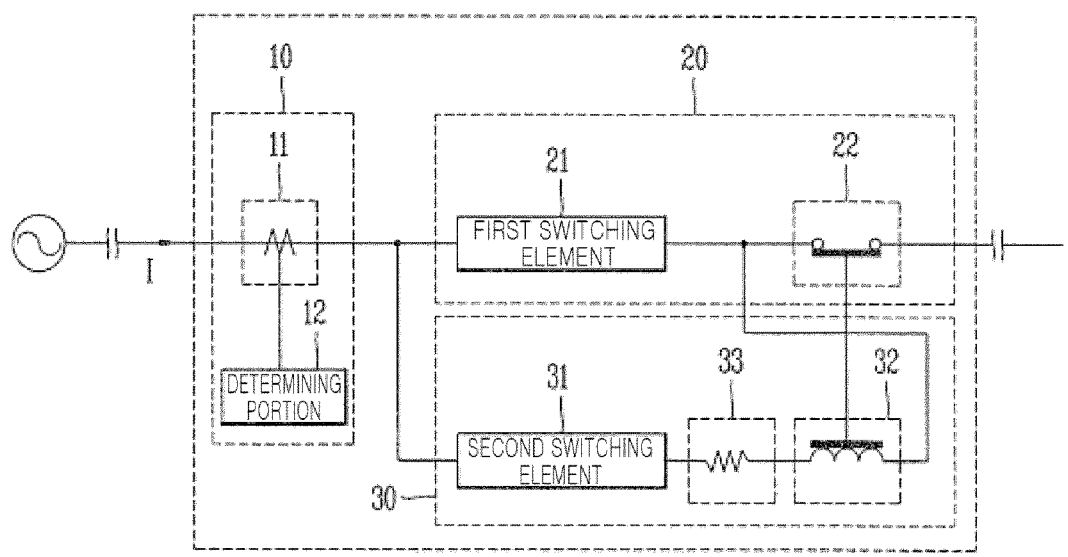
FIG. 7 is a configuration diagram which shows a configuration according to an embodiment of the DC circuit breaker shown in FIG. 4.

FIG. 7 is a configuration diagram which shows a configuration of an embodiment of the DC circuit breaker shown in FIG. 4.

Figure 8:
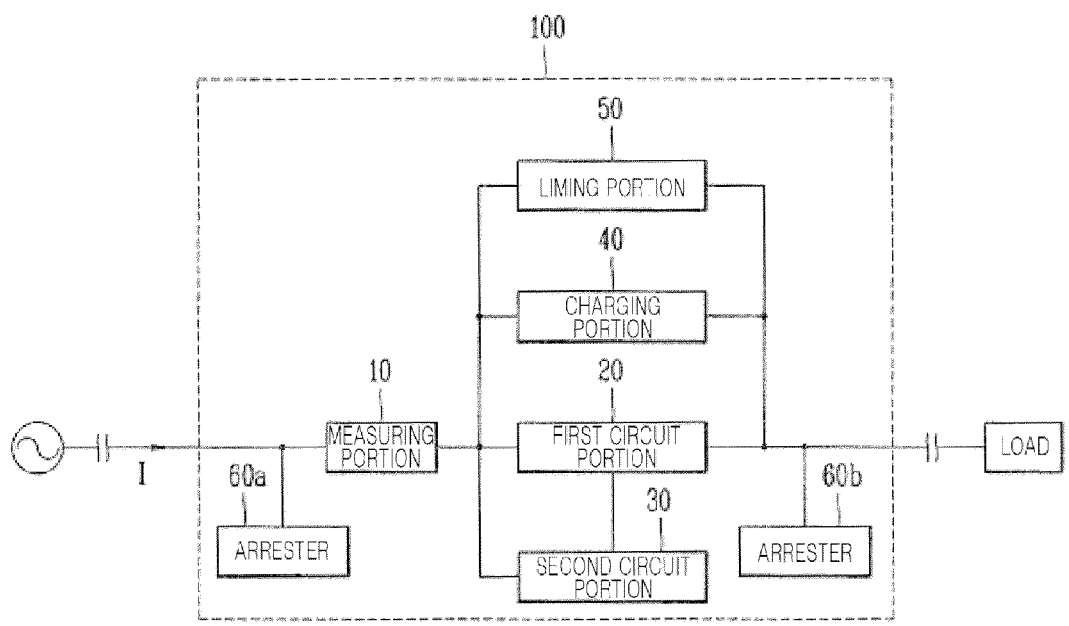
FIG. 8 is a configuration diagram which shows a configuration of a DC circuit breaker disclosed in this specification.

FIG. 8 is a configuration diagram which shows a configuration of a DC circuit breaker disclosed in this specification.

Figure 9:
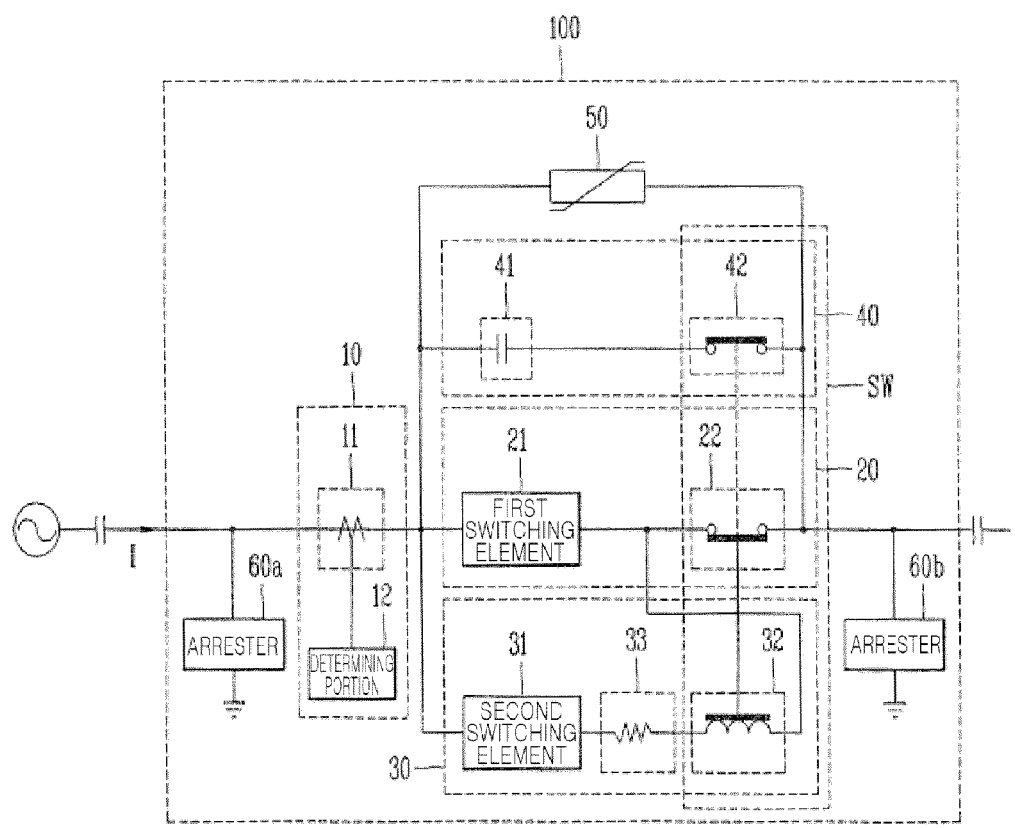
FIG. 9 is a configuration diagram which shows a configuration of an embodiment of the DC circuit breaker shown in FIG. 8.

FIG. 9 is a configuration diagram which shows a configuration of an embodiment of the DC circuit breaker shown in FIG. 8.

As shown in FIG. 4, the DC circuit breaker 100 comprises a measuring portion 10 which measures a DC current which is conducted to the first circuit portion 20, a first circuit portion 20 which conducts or blocks the DC current, and a second circuit portion 30 which conducts or blocks the DC current, which is bypassed from the first circuit portion 20, and controls the opening/closing of the first circuit portion 20 according to a measuring result of the measuring portion 10, and in the first circuit portion 20 and the second circuit portion 30, switching elements 21, 31, which are included in each of the first and second circuit portions, are connected such that they form a parallel structure.

The DC circuit breaker 100 can be a circuit breaker which is used in a DC system including a high volt direct current (HVDC), etc.

The DC circuit breaker 100 can be a circuit breaker which protects the system and inner components from accidents and failures which are occurring in the DC system.

The DC circuit breaker 100 can be installed between a power source of the DC system and a front stage of a device or a load, such that the DC current can be conducted.

The DC circuit breaker 100 can measure a current value of the DC current, the first circuit portion 20 can conduct the DC current to the device or the load, and the second circuit portion 30 can control a circuit breaking operation of the DC circuit breaker 100.

In the DC circuit breaker 100, the measuring portion 10 can perform a function of detecting the accident and the failure, the first circuit portion 20 can perform a function of a main circuit which conducts the DC current, the second circuit portion 30 can perform a function of controlling the circuit breaking operation of the DC circuit breaker 100.

The configuration according to an embodiment of the DC circuit breaker 100 is the same as shown in FIG. 5.

In the following, the embodiment of the DC circuit breaker 100 will be described by referring mainly to FIG. 5.

The measuring portion 10 measures the DC current which is conducted to the first circuit portion 20.

The measuring portion 10 can detect the accident and the failure based on the measured current value of the DC current.

For example, when the measured current value of the DC current is equal to or greater than a current rating value, it can be determined that the current value of the DC current comes to be equal to or greater than the current rating value due to the accident and the failure occurred in the DC system, which enables the accident and the failure to be detected.

The measuring portion 10 can include a current transformer 11, which is arranged at an earlier stage than the first circuit portion 20 and measures the DC current, and a determining portion 12 which determines whether a failure occurs based on a measuring result of the current transformer 11.

The measuring portion 11 can be a current transformer (CT) which measures the current value of the DC current which is conducted to the first circuit portion 20.

The current transformer 11 can deliver the measuring result to the determining portion 12.

The determining portion 12 can be a failure detector which determines whether the accident and the failure occur based on the measuring result.

When it is determined as the measuring result that the measured current value of the DC current is equal to or greater than the current rating value, the determining portion 12 can determine that the DC current comes to be the same or equal to the current rating value due to the accident and the failure, and can determine that the accident and the failure have occurred.

The determining portion 12 can enable the switching elements, which are included in each of the first circuit portion 20 and the second circuit portion 30, to operate according to the measuring result.

The determining portion 12 can generate open/close signals, on which the operations of the first switching element 21 and the second switching element 31 included in each of the first circuit portion 20 and the second circuit portion, respectively, are based according to the measuring result, and can deliver the generated signals to the first switching element 21 and the second switching element 31 included in each of the first circuit portion 20 and the second circuit portion, respectively.

The open/close signals can be the signals which control the first switching element 21 and the second switching element 31 included in each of the first circuit portion 20 and the second circuit portion, respectively, to be open-circuited or short-circuited.

That is, the first switching element 21 and the second switching element 31 included in each of the first circuit portion 20 and the second circuit portion, respectively, can perform the opening/closing operation according to the open/close signal generated by the determining portion 12.

The determining portion 12 can generate open/close signals for each of the first switching element 21 and the second switching element 31 included in each of the first circuit portion 20 and the second circuit portion, respectively, and can deliver the generated open/close signals to each of the first switching element 21 and the second switching element 31 included in each of the first circuit portion 20 and the second circuit portion, respectively.

For example, it can deliver a signal for the open-circuiting operation to the first switching element 21 included in the first circuit portion 20, and deliver a signal for the short-circuiting operation to the second switching element 31 included in the second circuit portion 20.

The first switching element 21 and the second switching element 31 included in each of the first circuit portion 20 and the second circuit portion can be opened and closed based on the open/close signal.

The first switching element 21 and the second switching element 31 included in each of the first circuit portion 20 and the second circuit portion can block the DC current, when they are opened, and can conduct the DC current, when they are closed.

That is, the determining portion 12 can enable the DC current to be conducted or blocked at the first circuit portion 20 and the second circuit portion 30 according to the determined result.

The first switching element 21 and the second switching element 31 included in each of the first circuit portion 20 and the second circuit portion can be power semiconductor elements which are turned on/off according to the measuring result of the measuring portion 10.

When the power semiconductor element is turned on, it can represent that it serves as a closed circuit.

When the power semiconductor element is turned off, it can represent that it serves as an open circuit.

The power semiconductor element can be a semiconductor element which can be turned on/off such as an insulated gate bipolar transistor (IGBT), an integrated gate controlled thyristor (IGCT), etc.

The power semiconductor element can be formed in a bidirectional structure in which two semiconductor elements conduct the current in different directions.

The power semiconductor element can be formed in a bidirectional structure in which two semiconductor elements are arranged in a series or parallel configuration to conduct the current in different directions.

For example, it can be arranged in the bidirectional structure in which two semiconductor elements are connected in series to each other as shown in FIG. 6A, or it can be arranged in the bidirectional structure in which two semiconductor elements are connected in parallel with each other as shown in FIG. 6B.

Since the power semiconductor element is formed in the bidirectional structure, the DC circuit breaker 100 can block the accident current or the fault current not only in the forward direction but also in the reverse direction, as shown in FIGS. 4 and 5.

Here, the accident current or the fault current in the reverse direction can mean the current due to the accident or the failure occurred in a load side, rather than the accident or the failure occurred in a source side of the DC system.

Alternatively, it can mean the reverse direction current due to the surge, failures, electromagnetic forces, or back electromotive forces, etc. which occur as a result of inner operations of respective components included in the DC circuit breaker 100.

That is, the DC circuit breaker 100 can protect the system or the devices not only from the accident and the failure occurred in the source side of the DC system, but also from the load side or internal problems of the DC circuit breaker 100.

The first circuit portion 20 can include the first switching element 21 which conducts and blocks the DC current and a first contact portion 22 which opens or closes the first circuit portion 20.

The first switching element 21 and the first contact portion 22 can be connected in series to each other.

The first switching element 21 can have an end which is connected to an input terminal to which the DC current is inputted.

The first contact portion 22 can have the other end which is connected to an output terminal from which the DC current is outputted.

The first switching element 21 can be the power semiconductor element which is described in the above.

The first switching element 21 can conduct and block the DC current through the opening/closing operation.

For example, it can conduct the DC current during a short-circuit operation (when it is turned on), and can block the DC current during an open-circuit operation (when it is turned off).

During a normal use, the first switching element 21 can perform the short-circuit operation to be turned on, thereby enabling the DC current to be conducted.

During the normal use in which the first switching element 21 operates at the short-circuit operation, the DC current can only be conducted through the first circuit portion 20.

The first switching element 21 can block the DC current according to the measuring result of the measuring portion 10 such that the DC current is bypassed toward the second circuit portion 30.

The first switching element 21 can block the DC current through an open-circuit operation at a high speed.

When it is determined that the DC current comes to be equal to or greater than the current rating value due to the accident and the failure, the first switching element 21 can receive the open/close signal from the measuring portion 10 to be open-circuited (turned off), such that the DC current is blocked.

the first switching element 21 can block the DC current such that the DC current is bypassed to the second circuit portion 30.

That is, the DC current, which previously flows through the measuring portion 10 by way of the first switching element 21, can now be bypassed to the second circuit portion 30 since the conduction path to the first circuit portion 20 is now closed when the first switching element 21 is open-circuited (turned off).

The first contact portion 22 can be short-circuited during the normal use, and can be open-circuited when a current flow through the driving coil 32 which is included in the second circuit portion 30.

The first contact portion 22 can represent a contact point switch which is opened and closed.

The first contact portion 22 can be an electronic switch.

The first contact portion 22 can be an electronic switch which can be operated by the driving coil 32.

The first contact portion 22 can be an electronic switch which is operated by the electromagnetic force occurred in the driving coil 32 when the current flows through the driving coil 32.

The first contact portion 22 is short-circuited during the normal use, and can be open-circuited by the electromagnetic force generated on the driving coil 32.

The first contact portion 22 can perform the function of completely blocking a conduction path of the first circuit portion 20 from the circuit.

That is, the first contact portion 22 can be short-circuited to maintain a conduction path of the first circuit portion 20 during the normal use, while it can be open-circuited to block the conduction path of the first circuit portion 20 when the current flows through the driving coil 32.

That is, in the first circuit portion 20, the first switching element 21 can perform the function of primarily bypassing the DC current, while the first contact portion 22 can perform the function of secondarily blocking the conduction path of the first circuit portion 20.

The second circuit portion 30 can include a second switching element 31 which conducts or blocks the DC current, which is bypassed from the first circuit portion 20, and the driving coil 32 which enables the first contact portion 22 included in the first circuit portion 20 to be open-circuited, when the current flows through it.

The first switching element 31 and the driving coil 32 can be connected in series to each other.

The second switching element 31 can be an end which can be connected to an end of the first switching element 21.

The driving coil 32 can have the other end which can be connected to the other end of the first switching element 21.

That is, the second switching element 31 and the driving coil 32 are connected in series to each other while they are connected in parallel with the first switching element 21.

That is, the first switching element 21 and the second switching element 31 can be arranged in the parallel structure.

The second switching element 31 can be the power semiconductor element which was described in the above.

The first switching element 31 can conduct and block the DC current through the opening/closing operation.

For example, it can conduct the DC current during a short-circuit operation (when it is turned on), and can block the DC current during an open-circuit operation (when it is turned off).

Although the second switching element 31 can operated at a short-circuit operation during the normal use, the DC current cannot be conducted because of the impedance of the driving coil 32.

That is, during the normal use in which the second switching element 31 operates at the short-circuit operation, the DC current can only be conducted through the first circuit portion 20.

The second switching element 31 can block the DC current through an open-circuit operation at a high speed.

When the DC current is bypassed by the first circuit portion 20, the second switching element 31 can conduct the bypassed DC current.

When the first switching element 21 operates at the open-circuit state (turned off), the second switching element 31 can block the conduction toward the first circuit portion 20 such that the second circuit portion 30 can conducted the bypassed DC current.

When the DC current is bypassed from the first circuit portion 20, the second switching element 31 can conduct the bypassed DC current, such that the current can flow through the driving coil 32.

When the DC current is bypassed around the first circuit portion 20 and conducted by the second switching element 31, the driving coil 32 can enable the first contact portion 22 to be open-circuited.

The driving coil 32 can be a relay which controls the opening/closing operation of the electronic switch.

The driving coil 32 can control the operation of the open/close switch including the electronic switch.

The driving coil 32 can control the opening/closing operation of the open/close switch by using the electromagnetic force (electromagnetic repulsive force) which is generated when the current flows through it.

The driving coil 32 can perform the function of controlling the first contact portion 22 of the first circuit portion 20 to be open-circuited, such that the conduction path of the first circuit portion 20 is blocked.

That is, the driving coil 32 can control the first contact portion 22 to be open-circuited by the electromagnetic force (electromagnetic repulsive force) which is generated when the bypassed DC current flows, such that the conduction path of the first circuit portion 20 is blocked.

The second switching element 31 can block the bypassed DC current after the first contact portion 22 is open-circuited by the driving coil 32.

That is, the second switching element 31 can control such that the current flows through the driving coil 32 and the driving coil 32 open-circuits the first contact portion 22, and that the DC current is blocked after the conduction path of the first circuit portion 20 is blocked.

That is, in the second circuit portion 30, the second switching element 31 can perform the function of conducting the bypassed DC current to the driving coil 32 and blocking the bypassed DC current after the conduction path of the first circuit portion 20 is blocked by the driving coil 32, and the driving coil 32 can perform the function of secondarily blocking the conduction path of the first circuit portion 20.

The detailed operation process of the DC circuit breaker 100, which has been described in detail, will be explained in terms of the DC current as follows.

At first, the DC current can be conducted through the first circuit portion 20 during the normal use.

The DC current can be conducted by the short-circuit operation (turn-on) of the first switching element 21, and passes through the first circuit portion 20 through the short-circuited first contact portion 22 by way of the first switching element 21.

In this case, although the second switching element 31 of the second circuit portion 30 is also operating at the short-circuit state (turned on), the DC current can be conducted through the first circuit portion 20 having an impedance relatively lower than the impedance of the driving coil 32.

That is, the DC current can be conducted in the sequence of the first switching element 21 and the first contact portion 22 during the normal use.

When an accident and a failure occur in the DC system causing the DC current to be equal to or greater than the current rating value, the measuring portion 10 determines this and delivers an open/close signal according to the determination to the first switching element 21, the first switching element 21 is operated at an open-circuit state (turned off) according to the open/close signal to block the DC current, and since the impedance of the first circuit portion 20 comes to be equal to or greater than that of the second circuit portion 30 due to the open-circuit state (turn off) of the first switching element 21, the DC current can bypass the first circuit portion 20 to be conducted to the second circuit portion 30.

When the DC current, which is bypassed from the first circuit portion 20, is conducted to the second circuit portion 30, since the second switching element 31 is operated at a short-circuit state (turned on), the bypassed DC current can flow to the driving coil 32 by way of the second switching element 31.

That is, the bypassed DC current can be sequentially conducted to the second switching element 31 and the driving coil 32.

When the current flow through the driving coil 32, the first contact portion 22 of the first circuit portion 20 is open-circuited by the electromagnetic force generated at the driving coil 32, such that the conduction path of the first circuit portion 20 is completely blocked; after the first contact portion 22 is open-circuited, the second switching element 31 is then operated at the open-circuit state (turned off), such that the bypassed DC current can be blocked by the second switching element 31.

That is, when the accident and the failure occur while the current flows through the first circuit portion 20 during the normal use, the DC current, which is bypassed from the first circuit portion 20, flows through the first circuit portion 20 such that the driving coil 32 controls the first contact portion 22 of the first circuit portion 20 to be open-circuited, and then the conduction to the first circuit portion 20 can be blocked by the open-circuit operation (turning off) of the second switching element 31.

The DC circuit breaker 100, which performs the operations as described in the above, can be formed in the same configuration as that of FIG. 7.

The second circuit portion 30 in the DC circuit breaker 100 can further include an impedance element 33 which prevents the overvoltage from being applied on the second switching element 31 as shown in FIG. 7.

When the second switching element 31 is implemented as a power semiconductor, in requires a constant voltage for operation, and when an overvoltage is applied on the second switching element 31, the second switching element 31 can be damaged; therefore, the impedance element 33, which can divide the overvoltage applied on the second switching element 31, can be included in the second circuit portion 30.

The impedance element 33 can be a resistor.

The impedance element 33 can be an impedance element which has a constant resistance value.

The impedance element 33 can be a variable resistor whose resistance value varies.

The impedance element 33 can be an impedance element whose resistance value can be adjusted.

The impedance element 33 can have a resistance value which is sufficient to prevent the overvoltage applied on the second switching element 31.

The impedance element 33 can also have a resistance value which enables a stable voltage to be applied on the second switching element 31.

When the second switching element 31 is implemented as a power semiconductor, it requires a constant voltage for operation, while the voltage for operation can be unstable due to the impedance of the first circuit portion 20, the impedance of the second switching element 31 itself, and the driving coil 32; therefore, the impedance element 33 can be included in the second circuit portion 30 in order to prevent the unstable voltage case.

The impedance element 33 has one end, which is connected to the other end of the second switching element 31, and the other end which is connected to one end of the driving coil 32.

That is, the second switching element 31, the impedance element 33 and the driving coil 32 can be connected in series to each other.

The impedance element 33 can maintain the impedance of the second circuit portion 30 to be higher than the impedance of the first circuit portion 20 during a normal use.

That is, the impedance element 33 can prevent the overvoltage from being applied on the second switching element 31, and also can have a resistance value which maintains the impedance of the second circuit portion 30 to be higher that the impedance of the first circuit portion 20.

The impedance element 33 can also limits the DC current which is bypassed from the first circuit portion 20.

Since the DC current, which is bypassed from the first circuit portion 20, is a large current, the bypassed DC current can damage the second circuit portion 30; therefore, in order to prevent this, the impedance element 33 can limit the bypassed DC current such that the bypassed DC current can be conducted through the second circuit portion 30 in a safe way.

The impedance element 33 can limit the DC current which is bypassed from the first circuit portion 20, and can have a resistance value which can limit the DC current within a range allowing the driving coil 32 to operate normally.

That is, the impedance element 33 can perform the function of limiting the DC current which is bypassed from the first circuit portion 20 by preventing the overvoltage from being applied on the first circuit portion 20, supplying a stable voltage across the second switching element 31, and maintaining the impedance of the second circuit portion 30 to be higher than the impedance of the first circuit portion 20 during the normal use.

The measuring portion 10, the first circuit portion 20, and the second circuit portion 30 as described above constitutes a basic configuration of the DC circuit breaker 100 and they can block the DC current through the operations as described above.

In the following, a more detailed embodiment of the DC circuit breaker 100 will be described.

The DC circuit breaker 100 includes the measuring portion 10, the first circuit portion 20, and the second circuit portion 30, and furthermore, the DC circuit breaker 100 can also include, as shown in FIG. 8, a charging portion 40 which is charged by the DC current bypassed from the first circuit portion 20 and the second circuit portion 30, and a limiting portion 50 which limits the current discharged from the charging portion 40.

The charging portion 40 and the limiting portion 50 can be connected in parallel with each other.

The charging portion 40 and the limiting portion 50 can be connected in parallel with the first circuit portion 20.

That is, one ends of the charging portion 40 and the limiting portion 50 are connected to the one end of the first circuit portion 20 while the other ends of the charging portion 40 and the limiting portion 50 can be connected to the other end of the first circuit portion 20.

The charging portion 40 is charged by the DC current which was primarily blocked by the first circuit portion 20 and bypassed to the first circuit portion 20, and then secondarily blocked and bypassed by the second circuit portion 30, such that it can perform the function of limiting the DC current.

The limiting portion 50 can limit the current discharged by the charging portion 40, after the charging of the charging portion 40 is completed by the DC current, which is bypassed from the first circuit portion 20 and the second circuit portion 30, such that it can perform the function of limiting the DC current in the final stage.

The more detailed configuration of the DC circuit breaker 100 having the charging portion 40 and the limiting portion 50 can be the same as that shown in FIG. 9.

As shown in FIG. 9, the charging portion 40 can include a capacitor 41 which is connected in parallel with the first circuit portion 20 and charged by the DC current, which is bypassed from the first circuit portion 20 and the second circuit portion 30, as well as a second contact portion 42 which opens or closes the charging portion 40.

The capacitor 41 and the second contact portion 42 can be connected in series to each other.

One end of the capacitor 41 can be connected to one end of the first switching element 21 included in the first circuit portion 20, while the other end of the second contact portion 42 can be connected to the other end of the first contact portion 22 included in the first circuit portion 20.

The capacitor 41 can represent an element having a capacitance value.

The capacitor 41 can be a capacitive element which can charge or discharge the current according to the capacitance value.

The capacitor 41 can have a capacitance value which enables the DC current bypassed from the first circuit portion 20 to be charged.

The capacitor 41 can charge the DC current bypassed from the second circuit portion 30, and then can discharge the charged current to the limiting portion 50 after being charged.

The capacitor 41 can be charged by the bypassed DC current from when the second contact portion 42 is close-circuited until the first contact portion 22 is open-circuited and the arc, which is generated at the first contact portion 22, is extinguished.

That is, the capacitor 41 can limit the DC current by charging the DC current which is bypassed from the second circuit portion 30, while a blocking process is performed on the first circuit portion 20 and the second circuit portion 30 and then completed.

The second contact portion 42 can represent a contact point switch which is opened and closed.

The second contact portion 42 can be an electronic switch.

The second contact portion 42 can be an electronic switch which is operated by the driving coil 32.

The second contact portion 42 can be an electronic switch which is operated by the electromagnetic force occurred in the driving coil 32 when the current flows through the driving coil 32.

That is, the second contact portion 42 can be an electronic switch of the same type as for the first contact portion 22.

The second contact portion 42 can be open-circuited during the normal use, and can be short-circuited when a current flow through the driving coil 32 which is included in the second circuit portion 30.

That is, the second contact portion 42 can be short-circuited by the driving coil 32 while the DC current bypassed to the second circuit portion 30 flows through it, such that the capacitor 41 is charged by the DC current which is bypassed from the second circuit portion 30.

The second contact portion 42 can perform the function of concatenating the conduction path of the charging portion 40.

That is, the second contact portion 42 can be open-circuited to block the conduction path of the charging portion 40, while it can be short-circuited to concatenate the conduction path of the charging portion 40 when the current flows through the driving coil 32.

That is, in the charging portion 40, the capacitor 41 can perform the function of charging and discharging the DC current which is bypassed from the second circuit portion 30, and the second contact portion 42 can perform the function of enabling the capacitor 41 to be charged and discharged by concatenating the conduction path of the charging portion 40.

In the charging portion 40, the capacitor 41 is charged by the DC current bypassed from the second circuit portion 30, and, when the charging is completed, discharges the charged current to the limiting portion 50 such that the discharged current can be limited by the limiting portion 50.

The limiting portion 50 can limit the current which is discharged from the charging portion 40.

The limiting portion 50 can be a current limiter for limiting the current, a fault current limiter, or a current limiting impedance element.

The limiting portion 50 can be the current limiter which has an impedance value varying according the current to be limited.

The limiting portion 50 can include at least one impedance element which can limit the current.

The limiting portion 50 can have an impedance higher than the impedances of the first circuit portion 20, the second circuit portion 30, and the charging portion 40, such that the DC current cannot be conducted, during the normal use or when the charging portion 40 is being charged.

That is, during the normal use, no current flows through the limiting portion 50, and the first circuit portion 20 and the second circuit portion 30 are blocked, and then the current can come to flow through the limiting portion 50 after the charging portion 40 is fully charged.

The DC circuit breaker 100 can also include arresters 60a, 60b at each of an input terminal, to which the DC current is inputted, and an output terminal, from which the DC current is outputted.

The arresters 60a, 60b can extinguish the remaining electrical energy inside the DC circuit breaker 100 after the circuit breaking operation of the DC circuit breaker 100.

The arresters 60a, 60b can also prevent the current, which is generated abruptly due to the accident and the failure, from being abruptly introduced to the DC circuit breaker 100.

That is, the arresters 60a, 60b can perform the function of protecting the DC circuit breaker 100 from internal and external problems.

As an additional feature of the configuration of the DC circuit breaker 100, the first contact portion 22, the second contact portion 42 and the driving coil 32 can be operated to be linked with one another, as shown in FIG. 9.

That is, when the current flows through the driving coil 32, the first contact portion 22 can be shifted from the short-circuit state to an open-circuit state while the second contact portion 42 can be shifted from the open-circuit state to the short-circuit state by the electromagnetic force generated by the driving coil 32.

That is, the driving coil 32 can control the operations of the first contact portion 22 and the second contact portion 42.

These operations can be performed at a high speed at the timing when the electromagnetic force is generated by the driving coil 32, and the operations of the respective contact portions can be performed simultaneously; or the contact portions can be operated with a predetermined time difference according to operation characteristics of the respective contact portions.

The detailed operation process of the DC circuit breaker 100 having the configuration as described in detail will be described as follows.

At first, the DC current can be conducted through the first circuit portion 20 during the normal use.

The DC current can be conducted by the short-circuit operation (turn-on) of the first switching element 21, and passes through the first circuit portion 20 through the short-circuited first contact portion 22 by way of the first switching element 21.

In this case, although the second switching element 31 of the second circuit portion 30 is also operating at the short-circuit state (turned on), the DC current can be conducted through the first circuit portion 20 having an impedance relatively lower than the impedance of the driving coil 32.

Also, since the second contact portion 42 of the charging portion 40 is open-circuited and the limiting portion 50 has a high impedance, the DC current can be conducted through the first circuit portion 20 which has a relatively low impedance.

That is, the DC current can be conducted in the sequence of the first circuit portion 20, the first switching element 21, and the first contact portion 22 during the normal use.

When an accident and a failure occur in the DC system causing the DC current to be equal to or greater than the current rating value, the measuring portion 10 determines this and delivers an open/close signal according to the determination to the first switching element 21, the first switching element 21 is operated at an open-circuit state (turned off) according to the open/close signal to block the DC current, and since the impedance of the first circuit portion 20 comes to be equal to or greater than that of the second circuit portion 30 due to the open-circuit state (turning off) of the first switching element 21, the DC current can bypass the first circuit portion 20 to be conducted to the second circuit portion 30.

When the DC current, which is bypassed from the first circuit portion 20, is conducted to the second circuit portion 30, since the second switching element 31 is operated at a short-circuit state (turned on), the bypassed DC current can flow to the driving coil 32 by way of the second switching element 31.

In this case, since the second contact portion 42 of the charging portion 40 is open-circuited and the limiting portion 50 has a high impedance, the DC current can be conducted through the second circuit portion 30 which has a relatively low impedance.

That is, the bypassed DC current can be conducted in the sequence of the second circuit portion 30, the second switching element 31, and the second contact portion 32.

When the current flow through the driving coil 32, the first contact portion 22 of the first circuit portion 20 is open-circuited by the electromagnetic force generated at the driving coil 32, such that the conduction path of the first circuit portion 20 is completely blocked; and then the second contact portion 42 of the charging portion 40 is short-circuited such that the conduction path of the charging portion 40 can be concatenated.

After the first contact portion 22 is open-circuited, the second switching element 31 comes to operate at an open-circuit state (turned off), such that the bypassed DC current is blocked by the second switching element 31; and then, the DC current, which is bypassed from the second switching element 31, can be conducted to the charging portion 40 to charge the capacitor 41.

That is, when the accident and the failure occur while the current flows through the first circuit portion 20 during the normal use, the DC current which is bypassed from the first circuit portion 20 flows through the second circuit portion 30 such that the driving coil 32 controls the first contact portion 22 of the first circuit portion 20 to be open-circuited, and the second contact portion 42 of the charging portion 40 to be short-circuited. Then, the second switching element 31 operates at the open-circuit state (turned off), the conduction to the second circuit portion 30 is blocked, and the DC current, which is bypassed from the second circuit portion 30, can be charged in the capacitor 41.

The DC current, which is bypassed from the second circuit portion 30, can be charged in the capacitor 41 from when the second contact portion 42 is short-circuited until the arc generated at the first contact portion 22 is extinguished.

That is, since the DC current, which is bypassed from the second circuit portion 30, is charged in the capacitor 41, the DC current can be temporarily limited until it is limited by the limiting portion 50.

When the charging on the capacitor 41 is completed, the capacitor 41 can discharge the charge current to the 50, such that the limiting portion 50 can limit the discharged current from the capacitor 41.

The current discharged from the capacitor 41 can be temporarily limited by the charging and discharging by the capacitor 41, such that the magnitude of the current can be decreased than when it is bypassed from the first circuit portion 20 and the second circuit portion 30.

The limiting portion 50 can limit the current discharged by the capacitor 41, and can finally limit the DC current.

Since the DC current is finally limited by the limiting portion 50, the circuit breaking process of the DC circuit breaker 100 can be realized.

When the DC circuit breaker 100 further include the arresters 60a, 60b, the arresters 60a, 60b can extinguish the remaining electrical energy after the circuit breaking operation.

In the following, the circuit breaking method of the DC circuit breaker disclosed in this specification is describe by referring mainly to FIG. 10 and additionally to FIG. 8.

Figure 10:
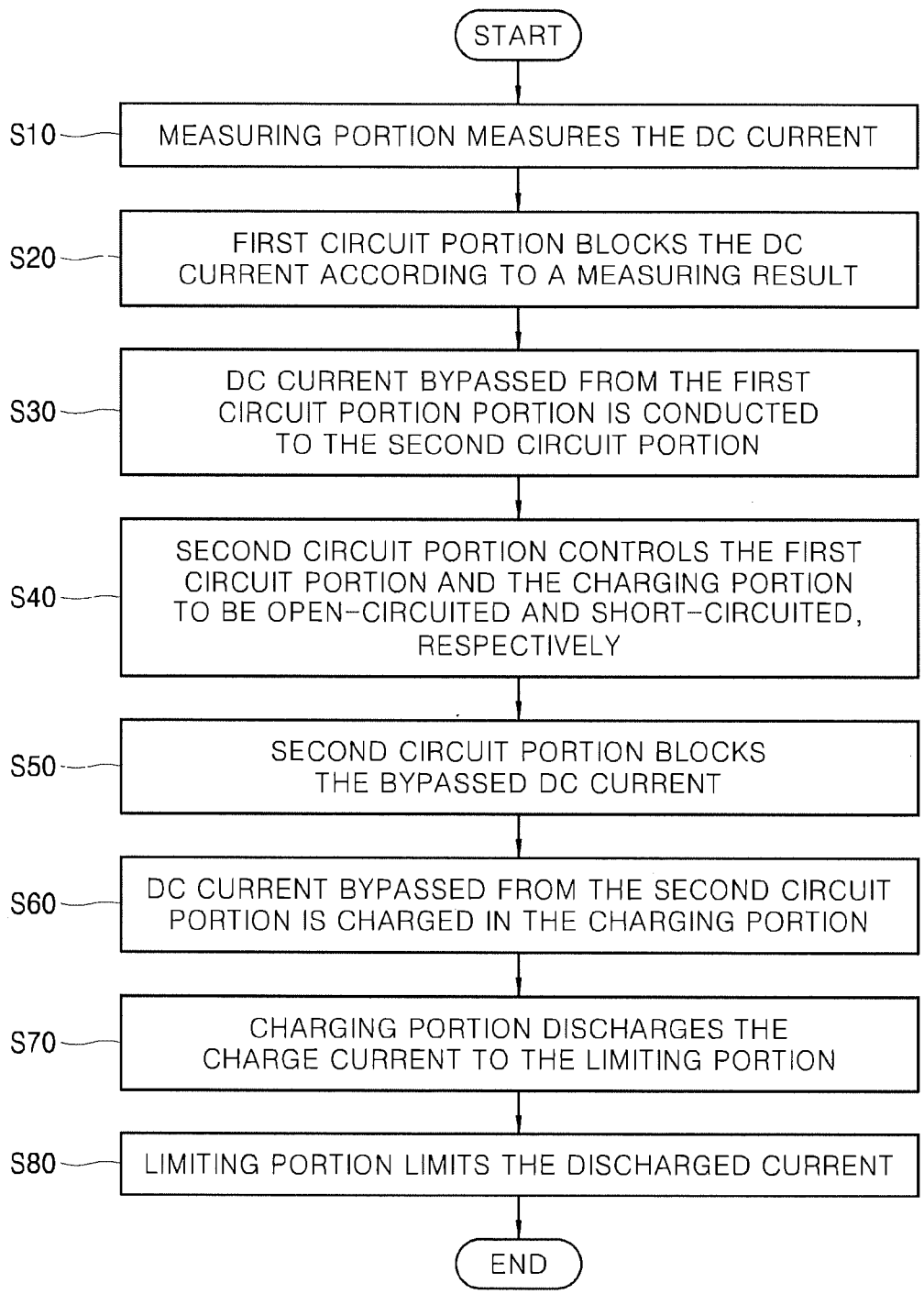
FIG. 10 is a flow chart showing sequential steps of the circuit breaking method of the DC circuit breaker disclosed in this specification.

FIG. 10 is a flow chart showing sequential steps of the circuit breaking method of the DC circuit breaker disclosed in this specification.

The circuit breaking method of the DC circuit breaker 100 ("circuit breaking method", hereinafter) can be the circuit breaking method performed by the DC circuit breaker 100 as described above.

The circuit breaking method can be the circuit breaking method performed by the DC circuit breaker 100 which includes a measuring portion 10 which measures a DC current which is conducted to the first circuit portion 20, the first circuit portion 20 which conducts or blocks the DC current, a second circuit portion 30 which conducts or blocks the DC current, which is bypassed from the first circuit portion 20, and controls the opening/closing of the first circuit portion 20 according to a measuring result of the measuring portion 10, a charging portion 40, and a limiting portion 50 which limits the current discharged from the charging portion 40 after the charging of the charging portion 40 is completed.

The circuit breaking method include a step S10 in which a measuring portion 10 measures a DC current which is conducted through the first circuit portion 10, a step S20 in which the first circuit portion 20 blocks the DC current according to the measuring result, a step S30 in which the DC current, which is bypassed from the first circuit portion 20, is conducted to the second circuit portion 30, a step S40 in which the second circuit portion 30 controls the first circuit portion 20 to be open-circuited and a charging portion 40 to be close-circuited, a step S50 in which the second circuit portion 30 blocks the bypassed DC current, a step S60 in which the charging portion 40 is charged by the DC current which is bypassed from the second circuit portion 30, a step S70 in which the charging portion 40 discharges the charged current to the limiting portion 50, and a step S80 in which the limiting portion 50 limits the discharged current.

At first, the DC current can be conducted through the first circuit portion 20 during the normal use.

The step S10 in which the measuring portion 10 can measure the DC current can measure the magnitude of the DC current which passes through the first circuit portion 20 during the normal use.

The step S10 in which the measuring portion 10 can detect the accident and the failure based on the measured current value of the DC current.

For example, when the measured current value of the DC current is equal to or greater than a current rating value, it can be determined that the current value of the DC current come to be equal to or greater than the current rating value due to the accident and the failure occurred in the DC system, which enables the accident and the failure to be detected.

The step S10 in which the measuring portion 10 can, when it is found as the measuring result that the measured current value of the DC current is equal to or greater than the current rating value, determine that the DC current comes to be the same or equal to the current rating value due to the accident and the failure, and can determine that the accident and the failure have occurred.

The step S20 in which the first circuit portion 20 blocks the DC current can, when it is determined in the step S10 of measuring the DC current by the measuring portion 10 that the DC current comes to be equal to or greater than the current rating value due to the accident and the failure, receive the open/close signal from the measuring portion 10 to open-circuit (turn off) the first switching element, such that the DC current can be blocked.

The step S20 in which the first circuit portion 20 blocks the DC current according to the measuring result can block the DC current such that the DC current can be bypassed to the second circuit portion 30.

In the step S30 in which the DC current bypassed from the first circuit portion 20 is conducted to the second circuit portion 30, the first circuit portion 20 can block the DC current in the step S20 of blocking the DC current according to the measuring result, and the DC current, which is bypassed from the first circuit portion 20, can be conducted to the second circuit portion 30.

As for the step S40 in which the second circuit portion 30 controls the first circuit portion 20 to be open-circuited and the charging portion 40 to be short-circuited, the bypassed DC current can flow through the second circuit portion 30 and though the driving coil included in the second circuit portion 30, and since the current flows through the driving coil, the first circuit portion 20 is controlled to be open-circuited by the electromagnetic force generated by the driving coil, while the charging portion 40 is controlled to be short-circuited.

As for the step S50 in which the second circuit portion 30 blocks the bypassed DC current, the first circuit portion 20 is open-circuited and the charging portion 40 is short-circuited in the step S40 in which the second circuit portion 30 controls the first circuit portion 20 to be open-circuited and the charging portion 40 to be short-circuited, and then the bypassed DC current can be blocked.

As for the step S60 in which the DC current bypassed from the second circuit portion 30 is charged in the charging portion 40, the bypassed DC current, which is blocked by the second circuit portion 30 in the step S5 in which the second circuit portion 30 blocks the bypassed DC current, is conducted to the charging portion 40, such that the charging portion 40 can be charged.

In the step S60 in which the DC current, which is bypassed from the second circuit portion 30, is charged in the charging portion 40, the DC current bypassed from the second circuit portion 30 can be charged in the charging portion 40 from when the charging portion 40 is short-circuited until the open-circuiting of the first circuit portion 20 is sufficiently completed.

In the step S70 in which the charging portion 40 discharges the charged current to the limiting portion 50, the charged current can be discharged to the limiting portion 50 after the charging of the charging portion 40 is completed.

As for the step S80 in which the limiting portion 50 limits the discharged current, the current which is discharged in the step S70 in which the charging portion 40 discharges the charge current to the limiting portion 50 can be limited by the limiting portion 50.

In the step S80 in which the limiting portion 50 limits the discharged current, the current discharged from the capacitor 41 is limited, such that the DC circuit breaker 100 can finally limit the DC current to be blocked.

The DC circuit breaker and the circuit breaking method thereof disclosed in this specification can be applied to all kinds of protective devices and current limiting circuits included in the protective devices such as conventional circuit breakers, switches, electric relays, surge absorbers, electronic contactors, and circuit breakers, etc. to which the technical principles of embodiments of the present invention can be applied and then practiced in them.

The DC circuit breaker and the circuit breaking method thereof disclosed in this specification have an effect of improving a high speed switching operation at a circuit breaking operation and facilitating the application of the high speed switch, performing the blockage of the DC current in a stable and efficient manner.

According to the DC circuit breaker and the circuit breaking method thereof disclosed in this specification, it is possible to realize higher speed performance than a driving method using a superconductor for the same fault current by delivering the overall fault current to a driving circuit by turning off the power conductor in the main circuit, rather than in the case of the driving force of a high speed switch generated according to the fault current divided by a resistance difference generated when the superconductor of the main circuit is quenched, when using a conventional superconductor.

According to the DC circuit breaker and the circuit breaking method thereof disclosed in this specification, an insert contact point can also be added into a parallel capacitor circuit which is linked with a circuit breaking contact point of the high speed switch, thereby preventing the capacitor from being charged undesirably during a normal state.

The preferred embodiments of the present invention described above are disclosed to solve the technical problems and the person having ordinary skill in the art can readily apply various modifications, variations, and additions within the principle and scope of the disclosure, and these modifications, variations, etc. are to be construed to be within the range of the appended claims.

For example, although a configuration, in which an impedance element 33 for preventing the overvoltage applied on the second switching element 31 is included in the second circuit portion 30, is described, the disclosure is not limited to this configuration. Other embodiments can include an impedance element, for preventing the overvoltage from being applied on the first switching element 21, between the first switching element 21 and the first contact portion 22 in the first circuit portion 20.

The impedance element can be a resistor. The impedance element can be an impedance element which has a constant resistance value. The impedance element can be a variable resistor whose resistance value varies.

What is claimed is:

1. A direct current (DC) circuit breaker comprising:
a first circuit portion configured to conduct or block a DC current;
a measuring portion configured to measure the DC current which is conducted to the first circuit portion;
a second circuit portion configured to conduct or block the DC current, which is bypassed from the first circuit portion, and further configured to control an opening or closing of the first circuit portion according to a measuring result of the measuring portion, wherein in the first circuit portion and the second circuit portion, switching elements, which are included in each of the first and second circuit portions, are arranged in a parallel structure;
a charging portion configured to be charged by the DC current which is bypassed from the first circuit portion and the second circuit portion; and
a limiting portion configured to limit a current which is discharged from the charging portion after the charging of the charging portion is completed,
wherein the charging portion and the limiting portion are connected in parallel with each other,
wherein the charging portion is connected in parallel with the first circuit portion and comprises:
a capacitor configured to be charged by the DC current which is bypassed from the first circuit portion and the second circuit portion; and
a second contact portion configured to open and close the charging portion,
wherein the capacitor and the second contact portion are connected in series to each other,
wherein the second contact portion is configured to be open-circuited during a normal use and close-circuited when the current flows through a driving coil which is included in the second circuit portion.

2. The DC circuit breaker of claim 1, wherein the measuring portion comprises:
a current transformer configured to be arranged at an earlier stage than the first circuit portion to measure the DC current; and
a determining portion configured to determine whether a failure occurs based on a measuring result of the current transformer.

3. The DC circuit breaker of claim 1, wherein the switching elements are power semiconductor elements configured to be turned on or off according to the measuring result of the measuring portion.

4. The DC circuit breaker of claim 3, wherein the power semiconductor elements are formed in a bidirectional structure in which two semiconductor elements are configured to conduct the current in different directions.

5. The DC circuit breaker of claim 1, wherein the first circuit portion comprises:
a first switching element configured to conduct and block the DC current; and
a first contact portion configured to open and close the first circuit portion,
wherein the first switching element and the first contact portion are connected in series to each other.

6. The DC circuit breaker of claim 5, wherein the first switching element is configured to block the DC current according to the measuring result of the measuring portion such that the DC current is bypassed toward the second circuit portion.

7. The DC circuit breaker of claim 5, wherein the first contact portion is configured to be close-circuited during normal use and configured to be open-circuited when the current flows through a driving coil which is included in the second circuit portion.

8. The DC circuit breaker of claim 7, wherein the second circuit portion comprises:
a second switching element configured to conduct and block the DC current which is bypassed from the first circuit portion; and
the driving coil configured to allow a first contact portion, which is included in the first circuit portion, to be open-circuited when the driving coil conducts the current,
wherein the second switching element and the driving coil are connected in series to each other.

9. The DC circuit breaker of claim 8, wherein the second circuit portion is connected in parallel with a first switching element which is included in the first circuit portion.

10. The DC circuit breaker of claim 8, wherein the second switching element is configured to block the bypassed DC current after the first contact portion is open-circuited.

11. The DC circuit breaker of claim 8, wherein the second circuit portion comprises an impedance element which is configured to prevent an overvoltage from being applied on the second switching element.

12. The DC circuit breaker of claim 1, wherein an impedance element is configured to maintain, during a normal state, the impedance of the second circuit portion to be higher than the impedance of the first circuit portion.

13. The DC circuit breaker of claim 1, wherein the capacitor is configured to be charged by the bypassed DC current from when the second contact portion is close-circuited until a first contact portion is open-circuited and the arc, which is generated at the first contact portion, is extinguished.

14. The DC circuit breaker of claim 1, further comprising:
arresters which are arranged at an input terminal, to which the DC current is inputted, and an output terminal, from which the DC current is outputted, respectively, wherein the arresters are configured to extinguish the remaining electrical energy after a circuit breaking operation of the DC circuit breaker.

15. A circuit breaking method performed by a DC circuit breaker, the method comprising:
- measuring, by a measuring portion, a DC current which is conducted through a first circuit portion;
- blocking, by the first circuit portion, the DC current according to a measuring result;
- conducting a DC current, which is bypassed from the first circuit portion, to a second circuit portion;
- controlling, by the second circuit portion, the first circuit portion to be open-circuited and a charging portion to be close-circuited;
- blocking, by the second circuit portion, the bypassed DC current;
- charging the charging portion by the DC current which is bypassed from the second circuit portion;
- discharging, by the charging portion, a charged current to a limiting portion; and
- limiting, by the limiting portion, the discharged current.

* * * * *